United States Patent
Mott

(10) Patent No.: US 7,161,907 B2
(45) Date of Patent: Jan. 9, 2007

(54) SYSTEM AND METHOD FOR DYNAMIC RATE FLOW CONTROL

(75) Inventor: James A. Mott, Oakland, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 980 days.

(21) Appl. No.: 10/092,289

(22) Filed: Mar. 5, 2002

(65) Prior Publication Data

US 2003/0169688 A1    Sep. 11, 2003

(51) Int. Cl.
   *H04J 3/14*     (2006.01)
   *H04L 12/26*    (2006.01)
   *G06F 15/16*    (2006.01)

(52) U.S. Cl. .............. 370/232; 370/252; 709/233

(58) Field of Classification Search ........ 370/230, 370/230.1, 231, 232, 235, 236, 238.1, 252, 370/295.41, 465, 468, 395.41, 395.21; 709/224, 709/226, 227, 228, 229, 233, 234
See application file for complete search history.

(56) References Cited

U.S. PATENT DOCUMENTS

| | | | | |
|---|---|---|---|---|
| 5,367,517 A | * | 11/1994 | Cidon et al. ............... | 370/431 |
| 6,046,983 A | * | 4/2000 | Hasegawa et al. ....... | 370/236.1 |
| 6,327,254 B1 | * | 12/2001 | Chuah ....................... | 370/328 |
| 6,597,662 B1 | * | 7/2003 | Kumar et al. .............. | 370/236 |
| 6,876,668 B1 | * | 4/2005 | Chawla et al. ............. | 370/468 |
| 6,934,752 B1 | * | 8/2005 | Gubbi ........................ | 709/225 |
| 6,937,580 B1 | * | 8/2005 | Heatwole et al. ........... | 370/322 |
| 2002/0021678 A1 | * | 2/2002 | Heatwole et al. ........... | 370/325 |
| 2002/0057651 A1 | * | 5/2002 | Roberts ...................... | 370/235 |
| 2002/0071450 A1 | * | 6/2002 | Gasbarro et al. .......... | 370/463 |

* cited by examiner

*Primary Examiner*—Seema S. Rao
*Assistant Examiner*—John Shew
(74) *Attorney, Agent, or Firm*—Park, Vaughan & Fleming LLP

(57) ABSTRACT

A system and method for providing dynamic rate flow control. An originating entity sets requested and target rates of communication within a communication sent to a destination entity. The requested and target rates may be expressed in terms of a "time to next communication" (e.g., a period of delay between transmission of successive communications). Intermediate devices (e.g., switches, routers) may decrease a target rate (thereby increasing the time between communications) but not the requested rate. Through a feedback process, the destination entity (or an intermediate entity) reports the target rate, and possibly the requested rate, back to the originator, which may accept and implement a reduced rate of communication, select a different communication channel, etc.

25 Claims, 5 Drawing Sheets

SYSTEM AND METHOD FOR DYNAMIC RATE FLOW CONTROL

BACKGROUND

This invention relates to the field of electronic communications. More particularly, a system and methods are provided for enabling dynamic rate flow control between two communicating entities.

Flow control is one of the basic mechanisms for enabling effective transfer of data or other electronic information. A sending entity may be able to prepare and transmit data faster than a receiving entity can receive and unload it, or faster than an intermediate device (e.g., switch, router) between the sending and receiving entities can process it. Flow control allows the rate of data transfer to be adjusted in order to prevent the slower device from losing information.

Several methods of flow control have been proposed or attempted, for various types of data transfer systems or environments. For example, the use of differentiated services in Ethernet networks enables packets to be prioritized or classified at any of a number of levels. However, there are generally no criteria established for accepting or rejecting a packet's claim to a particular priority, and therefore a class or priority of service may become over-subscribed. If a large number of data streams transiting one device (e.g., a switch) claim the same priority, contention between them may prevent the device from providing the expected level of service.

Some Ethernet systems employ a flow control scheme known as RSVP (Resource Reservation Protocol), in which intermediate routing devices reserve buffers for data streams. However, in this scheme each device must be configured with RSVP in order to for the system to take full advantage of its benefits. Many Ethernet networks contain a heterogeneous mixture of routing and switching devices, some of which are not equipped for RSVP and therefore cannot provide buffer allocation. Further, while RSVP guarantees no packet loss, it cannot assure a maximum latency. As a result, packets of any priority could be delayed for a significant period of time.

In other types of networks or data transfer systems, other schemes have been suggested. In one other scheme, communicating entities employ credits to allocate buffer space. A sending entity must receive a credit from a receiving entity before it can transmit, and the amount of data it may send may be limited by the number of credits it possesses. This scheme does nothing to prevent or alleviate congestion at intermediate devices between the sending and receiving entities. For example, a switch may receive traffic from many sending entities for one receiving entity simultaneously. Even though the receiving entity may be configured to handle the full amount of traffic (e.g., has issued appropriate credits), the traffic may be too much for the switch to handle at once. As a result, latency may become too large for some traffic.

Thus, existing flow control schemes are not designed to prevent or avoid congestion at intermediate devices or locations between sending and receiving entities. In particular, existing schemes do no manage latency effectively.

SUMMARY

Therefore, in one embodiment of the invention a system and methods are provided for enabling dynamic flow control at intermediate devices or points between a sending entity and a receiving entity. In this embodiment, a communication channel can be guaranteed a specific amount of bandwidth, or a specific rate of communication, at a switching device.

In this embodiment of the invention, a sending entity includes in a communication to be transmitted to the receiving entity two values that indicate, respectively, a target rate of communication (or bandwidth), and a requested rate of communication. The requested rate of communication represents the rate at which the sender would like to transmit communications to the receiver on a given channel, and cannot be changed by the receiver or any intermediate devices (e.g., switches, routers, hubs, repeaters). The target rate, however, can be altered by intermediate devices and the receiver. For example, if an intermediate device (or the receiver) cannot provide the requested (or target) rate of communication, then the target rate may be decreased to a rate that can be provided. The receiver notifies the sender of the target rate reported in the communication when received (and, possibly, the requested rate). The sender may then adjust its transmission rate, try a different channel, wait a while then try to get the requested rate again, or take some other action.

In one embodiment of the invention, the values used to indicate the target and requested rates of communication are expressed in terms of a "time to next communication," which may define a time period that the sender may or should delay between successive communications over the channel. Thus, in this embodiment, target and requested rates of communication are substantially equal to the inverses of these "time to next communication" values. In other embodiments, the target and requested rates of communication may be expressed in other manners.

In an embodiment of the invention, a switch or other intermediate device interprets a target rate of a communication as a target bandwidth. The reported target rate may correspond directly to a bandwidth, or may be converted as necessary to reflect a measure of bandwidth. For example, a "time to next communication" may be inverted to provide a bandwidth measurement. The device then compares that target bandwidth to the available bandwidth of the device (or the device port corresponding to the communication channel). If the target bandwidth can be provided, the communication is forwarded without alteration. If the available bandwidth is too low to accommodate the requested bandwidth, then the target bandwidth is decreased by altering the value in the communication before forwarding it. In particular, if the target rate of communication is represented as a "time to next communication," that value is increased to a value acceptable to the device.

DETAILED DESCRIPTION

Figure 1:
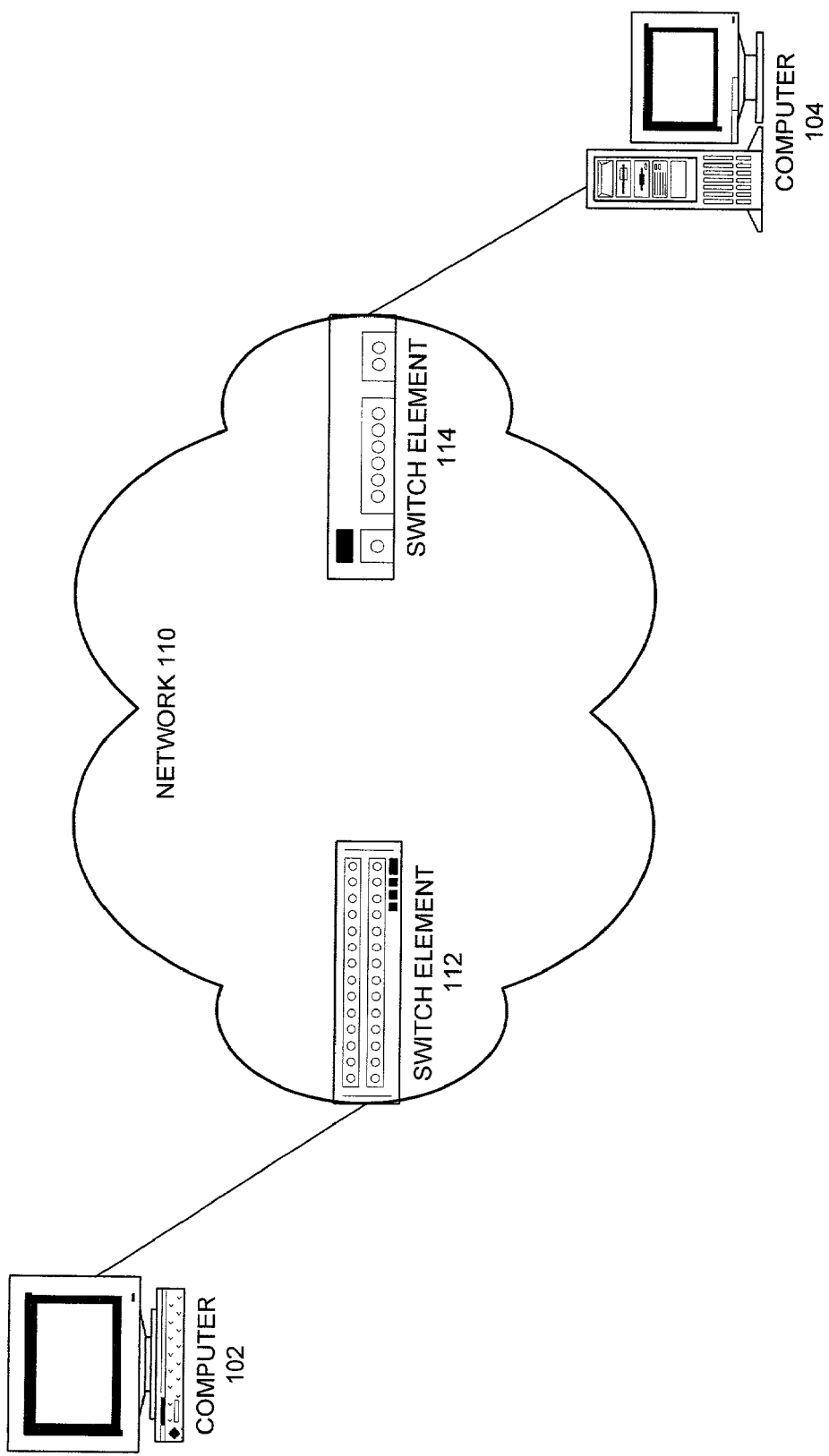
FIG. 1 is a block diagram depicting one environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for implementing dynamic rate flow control in a data transfer system between a sending entity and a receiving entity. The communicating entities may, for example, be computer systems linked by a network or other communication link. As another alternative, the communicating entities may comprise a computer system and an input/output subsystem. In general, embodiments of the invention may be implemented in virtually any communication environment in which two devices exchange data or information through one or more intermediate devices or modules.

In an embodiment of the invention, a sending entity modifies a communication (e.g., a packet, cell, frame) to a receiving entity by placing particular values into two fields (e.g., in a packet header). The values indicate or correspond to rates at which the sending entity should, or would like to, transmit communications to the receiving entity, and may be expressed as a measure of bandwidth, a rate of communication transmissions, etc. In this embodiment, the two fields differ in that one of them may be modified en route to, and at, the receiving entity, while the other is at least semi-permanent (i.e., cannot be modified en route). The first field may be considered a "target" rate of communication, and may be adjusted by intermediate entities (e.g., switching devices, relay elements, routers, input/output controllers) depending on their ability to provide the target rate of communication. The second field may be considered the "desired" or "optimal" rate of communication originally requested by the sender.

In one particular implementation of this embodiment, each of the values is expressed as a "time to next communication." In other words, each value in this implementation identifies a transmission delay to be applied between successive communications from the sending entity to the receiving entity. One skilled in the art may appreciate that the inverse of such a value provides a measure of the bandwidth needed to accommodate the corresponding communications. In particular, the inverse of the target rate of communication may be considered a "target bandwidth" (e.g., of a channel from the sender to the receiver), while the inverse of the requested rate may be considered a "requested bandwidth."

In embodiments of the invention discussed below, a communication may be characterized as containing "target" and "requested" rates of communication. These terms should be interpreted to refer to the actual values stored in the communication and/or another value calculated from the stored values, as appropriate. Thus, a particular target rate of communication may refer to a target "time to next communication" reported in a packet or a measure of bandwidth calculated from that target, or yet some other appropriate value associated with, or derivable from, the target time to next communication.

Illustratively, when an intermediate device receives a communication in an embodiment of the invention, it examines the target rate of communication and determines whether it can support it. If so, it may simply note the request and forward the communication toward the destination. If, however, it cannot provide the target rate (e.g., it has insufficient bandwidth or insufficient unallocated bandwidth), then it may alter the target rate (e.g., decrease it) to a level that it can provide. If, as described above, the target rate is expressed as a "time to next communication," then decreasing the target rate of communication means that the time period between communications is to be increased.

As the communication transits a channel or other communication path from the originating entity to the destination entity, the target rate of communication may be altered. The destination entity may also adjust the target rate if necessary. Thus, when the communication arrives at the destination, the destination entity acknowledges it and returns to the originating entity either or both of the requested and target rates of communication. This feedback process allows the originating entity to determine if this channel is suitable (e.g., provides suitable quality of service) and informs the originating entity of the need to reduce its communication rate, if necessary. The rate of communication between the originating and destination entities may thus be determined by the slowest or most congested intermediate device. If the target rate reported back to the originator is less than the requested rate, the originator may choose to use a different communication path or channel, wait a period of time until resuming communication with the destination, accept the target rate, continue sending communications while requesting its preferred rate, etc.

Illustratively, until the originating entity receives feedback indicating a lower rate of communication is required (or until it finishes sending its communications), it will schedule transmission of communications at the rate indicated in the target rate of the last communication sent. In addition, the originating entity may still signal a request for additional bandwidth (or a decreased "time to next communication"), even during the dynamic flow control described herein.

FIG. 1 depicts an illustrative communication environment in which an embodiment of the invention may be implemented. Two computing or communication devices, computers 102, 104, exchange data or information via a communication channel through network 110. Network 110 may be a public or private switched network, may be composed of wired and/or wireless links, etc. In this embodiment, network 110 includes one or more switching or relay elements (e.g., switches, routers, gateways), such as switch elements 112, 114, for guiding a communication to its destination.

As described above, a communication (e.g., packet) sent from computer 102 to computer 104 may transit one or more of switching elements 112, 114. Depending on the available bandwidth of a switching element, a target rate of communication indicated in a field of the communication (e.g., in a packet header) may be decreased because the switching element is handling a large volume of communication traffic, is a slow device, etc. Even if one switching element decreases a target rate, a later switching element (or computer 104) may decrease it even further.

In a present embodiment of the invention, an originating entity may set the requested and/or target field values to zero or some other low threshold or predetermined value, thereby indicating that the originating entity wishes to claim the entire available bandwidth. In this case, the zero value reflects the originator's intention to have no, or minimal, delay between the communications it sends to a destination. This may also be interpreted or recorded as indicating an "infinite" bandwidth or rate of communication (i.e., the inverse of zero). Intermediate devices (e.g., switches, controllers, routers) may, however, be permitted to reduce the requested rate according to their available data rates or bandwidths.

In one alternative embodiment, communications may be assigned priorities and intermediate devices may arbitrate between different priorities in a variety of fashions. For example, highest priority communications may be granted their requested data rates (or target rates), while lower priority communications may be more susceptible to having their target rates reduced in order to provide the higher priority traffic with suitable bandwidth. As another example, each priority class or level may be allocated a particular percentage of an intermediate device's bandwidth, and each communication within a class or priority level may be limited according to the available bandwidth within its class.

A predetermined maximum value may be stored in the target field in order to force the originator of a communication to cease sending communications. This could be interpreted as forcing an infinite "time to next communication," or a rate of communication equal to zero. Thus, a severely congested switch or destination entity may force the originator to use a different communication channel or path, or to stop sending data for a period of time or until otherwise notified.

Figure 2:
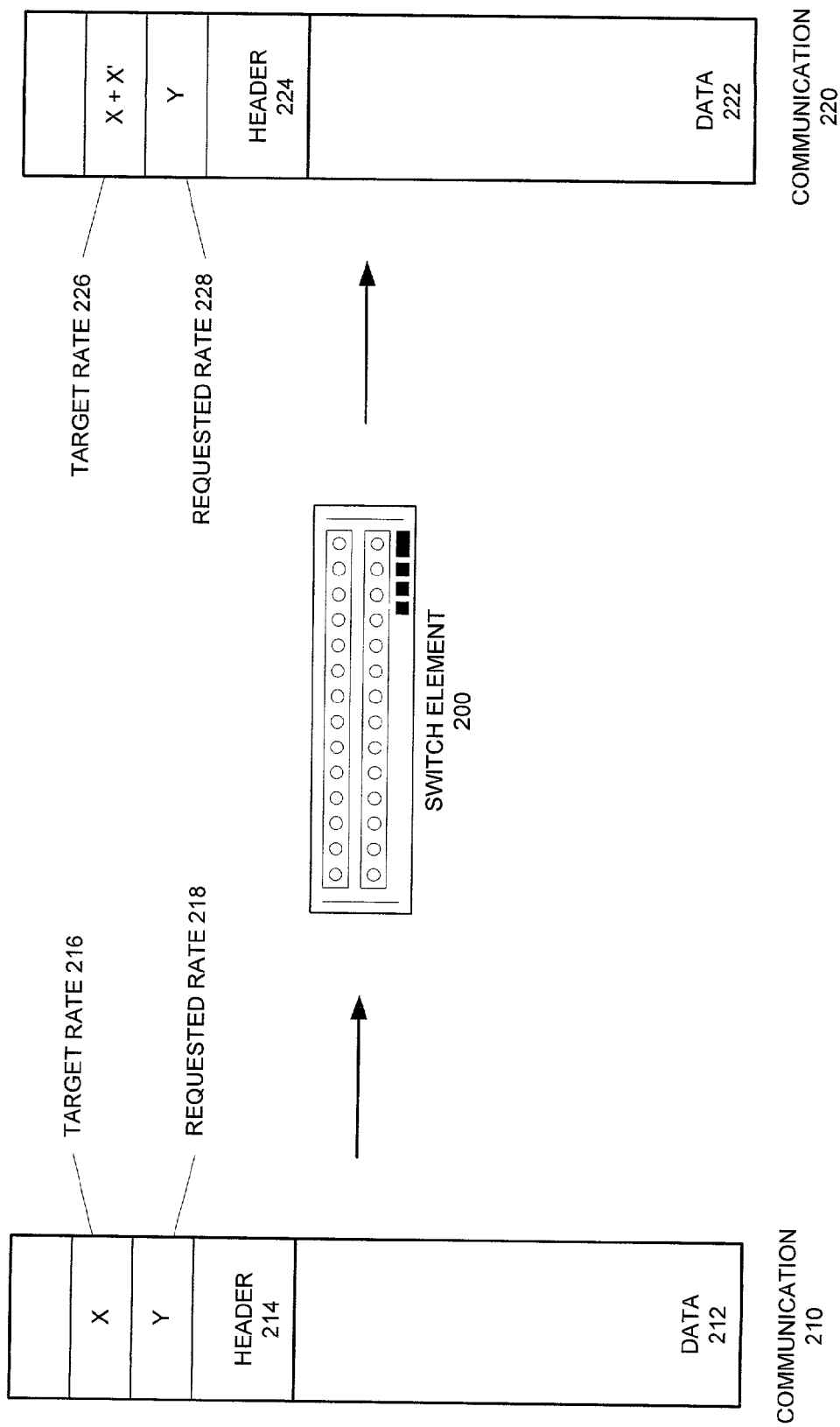
FIG. 2 is a block diagram demonstrating the modification of a communication's target rate of communication by a switching element, according to one embodiment of the invention.

FIG. 2 demonstrates the modification or annotation of a target communication rate by an intermediate device, according to one embodiment of the invention. Switch element 200 may be a switch, a router, or other device or system configured to relay or direct communications from one entity to another. In FIG. 2, communication 210 is received by switch element 200 from an originating entity or another intermediate device. After processing the communication, it is forwarded toward the destination entity as communication 220. Switch element 200 may thus form part of a communication channel, circuit or path between the originating and destination entities.

In this embodiment, target and/or requested rates of communication carried in fields 216, 218 of communication 210 are expressed as times between successive communications sent from the originator to the destination on a particular channel. The units of time may be understood to be seconds, milliseconds, hundreds of milliseconds, etc.

In the illustrated embodiment, the communication as it is received by switch element 200 (communication 210) differs from the form in which it is forwarded from the switch element (communication 220) primarily in that a target rate of communication has been altered.

Communication 210 includes header 214 and may include a data portion 212. In addition to information or fields for applicable communication protocols, header 214 includes target rate of communication 216 and requested rate of communication 218. Communication 220 includes header 224 and may include a data portion 222. Header 224 of communication 220 includes target rate of communication 226 and requested rate of communication 228.

Target rate 216 and requested rate 218 of communication 210 may have initially been equal when communication 210, or an earlier form of communication 210, was generated by its originating entity. In this embodiment, requested rate 218 remains the same throughout its journey to the communication's destination. Target rate 216, however, may be altered to reduce the rate at which the originating entity may communicate with the destination through this channel. In particular, switch element 200 alters the target rate of the incoming communication (target rate 216) and inserts a new (e.g., slower) rate (target rate 226) in the forwarded communication. The slower rate is recorded in communication 220 as a longer "time to next communication." Thus, while the value recorded in the communication is actually increased, it represents and is interpreted as a lower rate of communication and a lower bandwidth.

When switch element 200 receives communication 210, it retrieves target rate 216 (i.e., the value X) and/or requested rate 218 (i.e., the value Y) and may save them (e.g., for comparison with rates from previous and/or future communications). The switch element then determines the bandwidth required to provide the target rate—the "target bandwidth"—by computing the inverse of the target rate. The target bandwidth may then be compared to available or unallocated bandwidth at the switch element, or at a port through which the communication will be forwarded. In FIG. 2, switch element 200 determines that it cannot accommodate or provide the target bandwidth. Therefore, it increases the time period that the originator of the communication should delay between communications. The increase in time may be represented as X', thus increasing the target time between communications to X+X' and decreasing the target rate accordingly.

In alternative embodiments of the invention, target and/or requested rates may be recorded in a communication as bandwidths, baud rates, etc., or a switch element may work with time periods between communications rather than bandwidths. Thus, the form or manner in which a target and/or requested rate of communication or "time to next communication" is noted or manipulated in a communication is not restricted or limited in different embodiments of the invention.

In one embodiment of the invention, a switch element or other intermediate device determines an available or unallocated bandwidth (e.g., for the entire element or for a particular port) by sampling or monitoring its communication traffic for a period of time, allocating bandwidth to communication channels active during that time, aggregating the bandwidth allocated to the channels and subtracting that from the maximum bandwidth of the element or the particular port. The time period during which traffic is sampled may be termed an epoch.

With the available bandwidth calculated during an epoch, a switch element can then (e.g., after the epoch, during a subsequent epoch) determine whether to accept a new communication channel, select the rate of communication (or bandwidths) to grant to a new channel, allow an existing channel to increase its rate of communication (or bandwidth), eliminate a channel that was inactive during a previous epoch (e.g., according to an applicable policy), etc.

In particular, when a communication is received after the epoch, the switch element determines whether the channel in which the communication was received was allocated bandwidth or a rate of communication during the epoch. If it was, then the communication's target rate of communication (or bandwidth) is compared to the rate (or bandwidth) granted during the epoch. If the target rate is higher, then it determines whether there is sufficient bandwidth available to accommodate the increase. If so, then the communication may be forwarded without any change; otherwise, its target rate is decreased to a rate that can be accommodated.

If the channel is new (e.g., it was not active during the past epoch), then its target rate is compared to the available bandwidth. In particular, if the target rate is expressed as a time between communications, the inverse of that time is taken to yield the target bandwidth necessary to provide the target rate, and the target bandwidth is compared to the available bandwidth. If sufficient bandwidth is available, then the communication may be forwarded without any change to its target rate; otherwise, the target rate is reduced to correspond to the amount of available bandwidth (or some lower bandwidth) before forwarding the communication.

If an intermediate device decreases the target rate of a communication to zero (e.g., increases the target time between communications to a maximum value or predetermined value)—thereby forcing the originating entity to stop transmitting on this channel—it may transmit the communication back toward the originating entity rather than forward it toward the destination.

In one embodiment of the invention, if the originating entity places the maximum time between communications in the requested rate of communication field (e.g., representing zero or minimal rate of communication), an intermediate device or the destination entity may interpret this to mean that the originating entity has no more data to send (e.g., that the present communication is the final communication in the channel). Accordingly, the value in the target rate of communication field set by the originating field in this final communication may represent bandwidth that the intermediate device or destination entity may free up for other communication channels. As described above, destination entities may report to originating entities the target rates indicated in communications received from the originators and, if the reported target rates are acceptable, the originating entity may implement them in subsequent communications.

A switching device, such as switch element 200 of FIG. 2, may implement a method of dynamic rate flow control described herein in hardware so that it may be performed quickly. The requested and target rate of communication fields in a communication may be on the order of 32 bits in size.

In an embodiment of the invention, an originating entity may store (e.g., in a local memory) the rate at which it is to send communications to a destination entity on a given channel, which may initially equal its requested rate and may thereafter be decreased as feedback is received. It may also store the maximum rate or an upper rate threshold (i.e., representing a relatively high bandwidth) that represents monopolization of a communication channel. If, for example, an originating entity sets its requested and/or target rates to this upper threshold, and feedback indicates that this maximum rate is acceptable, the originating entity may then send its communications with only minimal, or no, delay between them. The originating entity may also store the minimum rate or a lower threshold, such as zero (i.e., representing a relatively low bandwidth) which it may use to indicate the release of a channel.

Intermediate devices may store various values, including maximum bandwidths for the device and/or each port, available bandwidth (e.g., as determined during each epoch), recent target and/or requested rates of communications (before and/or after being decreased, if necessary), etc.

Different embodiments of the invention may be implemented for different network protocols and technologies (e.g., Ethernet, Asynchronous Transfer Mode (ATM)). One embodiment of the invention is well suited for implementation with InfiniBand, a channel-based switched fabric approach to electronic communication (see http://www.infinibandta.org). In this embodiment, a Queue Pair (QP) comprises two channel adapters coupled together via a switching fabric comprising one or more serial communication links. The channel adapters may be installed in separate computer systems, a computer system and an input/output subsystem, or some other combination of cooperative entities that need to exchange information electronically. An epoch may be defined as any suitable time interval, such as one second, multiple seconds, a fraction of a second, etc. Illustratively, epochs may run successively, although in an alternative embodiment there may be a delay between the end of one epoch and the beginning of the next. In yet another alternative embodiment, epochs may overlap.

In an embodiment of the invention suited for InfiniBand, a switching element (e.g., switch, router) in the fabric calculates a total of all bandwidth used at each of its ports during each epoch, based on the target rates of communications that transit each port. For example, for each communication that transits a given port during the epoch, the switching element may calculate the summation of the inverses of the target rates in each communication (expressed as times to next communication), thereby allocating each of them their target rates. The difference between that total and the port's maximum bandwidth during an epoch time period represents the "available bandwidth" that can be allocated, after the epoch, to new and/or existing channels. If the port is too congested to service every communication during an epoch, the duration of an epoch (i.e., the epoch period) may be extended, the unserviced communications may be rejected, their processing may be delayed until after the epoch, etc.

If the available bandwidth carried over for allocation after an epoch is zero, then communications received for new channels (i.e., channels that were not active during the epoch) may be re-routed to their originators (and their target rates may be set to a lower threshold, such as zero) or may be routed through a different path (e.g., through a port that has available bandwidth). And, existing channels will be limited to the bandwidth allocated to them during the previous epoch.

If, however, the available bandwidth is not zero, but is less than the target bandwidth of a communication on a new channel (e.g., where the target bandwidth is the inverse of the target rate or time to next communication), then the target rate of the communication may be decreased to a rate corresponding to the available bandwidth (e.g., by setting the target rate or time to next communication to the inverse of the available bandwidth). Similarly, communications received on existing channels that contain higher target rates than were allocated in the previous epoch may be granted the higher rate or may be curtailed.

In one alternative embodiment of the invention, intermediate devices may compare their available bandwidths to the requested rate (i.e., rather than the target rate) of a channel's communication. In this embodiment, the slowest or most congested intermediate device may still determine the effective rate of the channel but, because the intermediate devices carrying the channel may allocate bandwidth based on the requested rate, once the congested intermediate device becomes uncongested, a channel may be able to quickly increase its rate of communication.

In an embodiment of the invention in which intermediate devices try to meet communications' requested rates (rather than just target rates), if an intermediate device cannot provide the requested rate, it may decrease the target rate to a rate that it can provide, unless the target rate is already at such a rate (or lower). When the originator of the communication receives feedback for the communication, it may then transmit at that target rate but periodically send a communication with a target rate matching its requested rate (or some other preferred rate) to see if the channel is now clear enough to provide the higher rate.

Figure 3A:
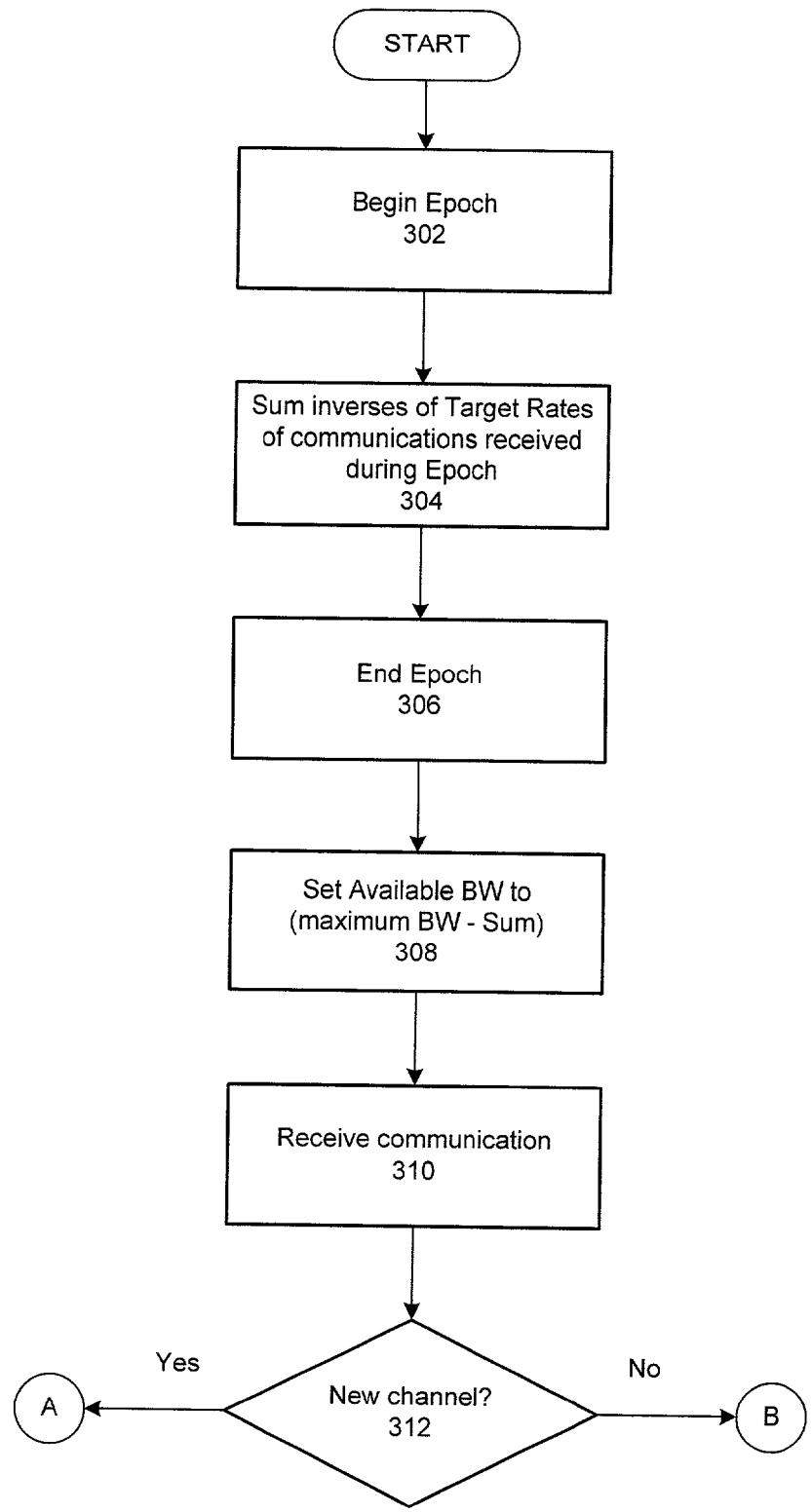
FIGS. 3A–3C comprise a flowchart illustrating one method of dynamically adjusting the communication rate of a communication channel in accordance with an embodiment of the invention.
Figure 3B:
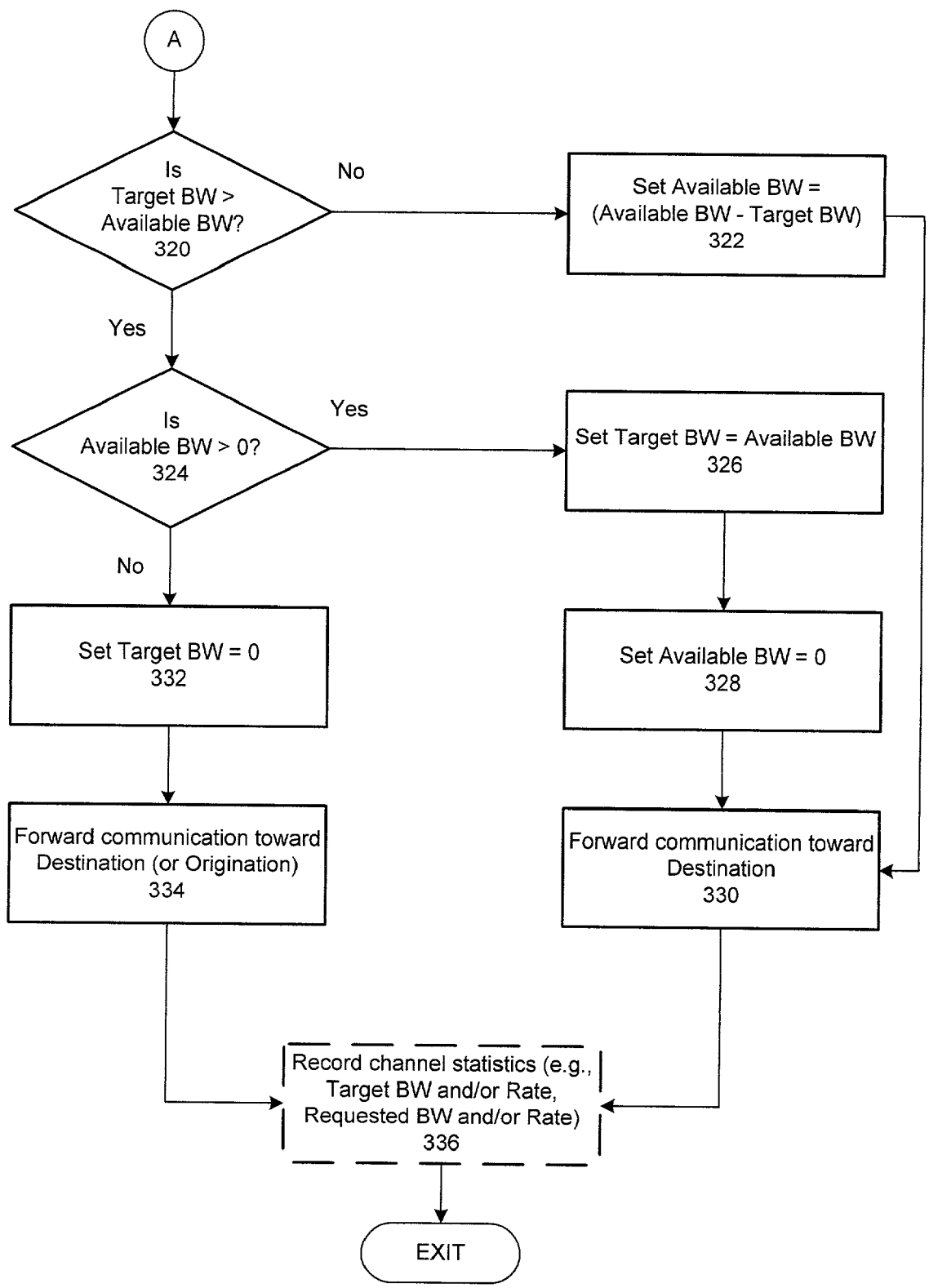
Figure 3C:
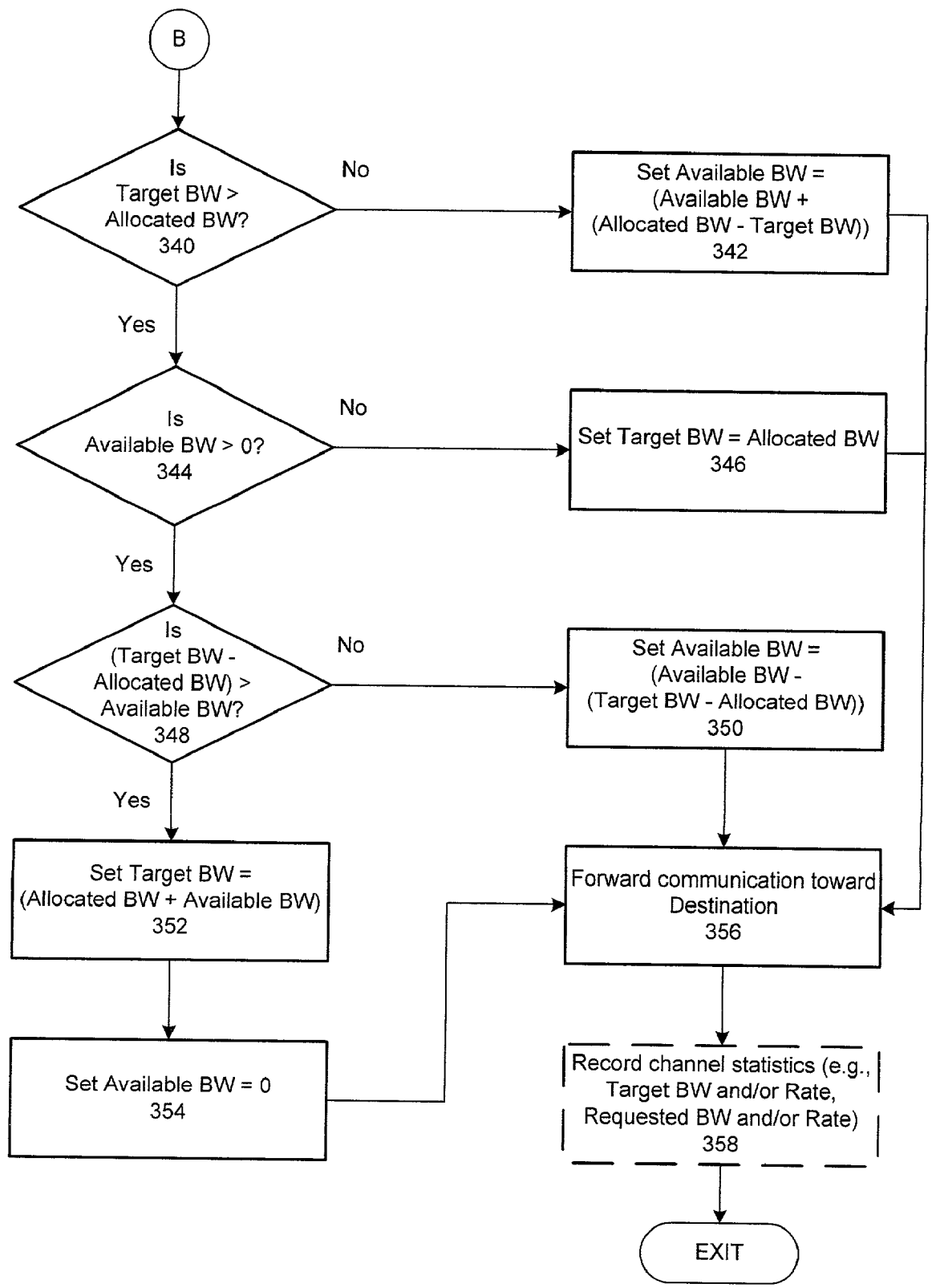

FIGS. 3A–C demonstrate one method of performing dynamic rate flow control according to one embodiment of the invention. In this embodiment, two computing systems communicate via a channel through a network. The method of FIGS. 3A–C may be implemented at a switching device (e.g., a switch, router) within the network. One skilled in the art will appreciate how the illustrated method may be modified for different types of network technologies, communicating entities, switching devices and links between the entities.

In state 302 an epoch begins, during which an available bandwidth of each port of the switching device may be computed. Illustratively, each epoch may be of a predetermined duration (e.g., one second), and they may run consecutively or at some regular interval.

In state 304, for one or more ports, the switching device retrieves target communication rates from communications received at the switching device that are to be transmitted through the port. The device determines the inverse of each target rate and sums the inverses. In this method, each target rate is expressed as a "time to next communication" (e.g., a delay that the communication originator will implement between communications). Their inverses thus provide a measure of the bandwidth needed to enable or accommodate the target rates, and may be termed target bandwidths. The total of the inverses may thus be considered a total target bandwidth for the epoch.

As long as the total target bandwidth for a port is less than the port's maximum bandwidth (which may be a fixed value based on the type of device, operating speed, etc.), each communication channel may be allocated its target bandwidth. If the total target bandwidth exceeds the maximum bandwidth then, as described below, a target bandwidth may be decreased. Alternatively, a communication may be rejected, delayed or processed after the epoch.

Illustratively, each communication included in the calculations of state 304 may be for a different channel. If so, then each channel having a communication processed during the epoch receives an allocated portion of the port's bandwidth (e.g., equal to its target bandwidth). If multiple communications are received for a channel during the epoch, the channel may receive an allocation equal to the target bandwidth of the last communication, the average of the multiple communications' target bandwidths, a weighted average, etc. For each channel that is active during the epoch, the switching device may record any or all of: a channel identifier, identities of the communicating entities, a target rate or bandwidth, an allocated bandwidth, a priority of the communication, etc. In addition, the switching device may also extract and record a requested rate of communication (or its inverse, a requested bandwidth) in addition to, or instead of a target rate/bandwidth.

In succeeding epochs, the information recorded from one epoch may be updated or replaced. For example, a communication for a given channel in a later epoch may have a higher (or lower) target communication rate (or requested communication rate). Further, channel data or statistics that are recorded during one epoch may be deleted or removed at the end of a subsequent epoch in which the channel is not active.

In state 306 the epoch ends.

In state 308 the available (e.g., unallocated) bandwidth for each port of the switching device is computed from its maximum bandwidth minus the total target bandwidth allocated during the epoch.

In state 310, at some time after the end of the epoch (e.g., during a subsequent epoch), a communication is received at the switching device. The switching device identifies the communication's channel and the port through which the communication may be forwarded toward its destination. During an embodiment of the invention in which epochs run consecutively or periodically, all or a portion of the remainder of the illustrated method may occur during the epoch subsequent to the one that ended in state 306.

As described above, the communication includes a target communication rate and a requested communication rate, which are initially populated by the originating computer system with equal values. The target rate value may be amended prior to its receipt by the switching device (e.g., by a previous switching device), but its requested rate still reflects the value set by the originator.

In state 312 the switching device determines whether the communication's channel is new or old—e.g., whether it was active during the preceding epoch. In particular, the switching device may, in this embodiment of the invention, process a communication differently if it had channel bandwidth allocated to it previously (during the previous epoch) than if the channel was not active during the preceding epoch and therefore does not have port bandwidth allocated to it. If the channel is new (i.e., was not active during the preceding epoch), the illustrated method continues at state 320; otherwise, the method proceeds to state 340.

In state 320, the switching device determines whether the communication's target bandwidth (e.g., the inverse of its target communication rate) exceeds the available bandwidth for the port. If so, the illustrated method advances to state 324. Otherwise, the method continues at state 322.

In state 322, the available bandwidth is sufficient to accommodate the target bandwidth and so the communication channel is allocated the target bandwidth and the available bandwidth is decreased accordingly. If another epoch is running at the time of state 322, the target bandwidth of the present communication may be included in the total target bandwidth for the epoch. After state 322, the communication is forwarded toward its destination in state 330.

In state 324, the available bandwidth is insufficient to accommodate the target bandwidth, and the switching device determines whether there is any bandwidth available at all. If the available bandwidth is greater than zero, the method continues at state 326; otherwise, if there is no bandwidth available, the method advances to state 332.

In state 326, the target bandwidth is set to the available bandwidth. In particular, the target rate within the communication (i.e., target "time to next communication") is set to the inverse of the available bandwidth, thereby indicating the decreased rate at which the port can handle the channel's traffic.

In state 328, the available bandwidth is decreased to zero, thereby indicating that all of the port's bandwidth has been allocated.

In state 330, the communication is forwarded toward the destination computer system and the method advances to state 336.

In state 332, the target bandwidth is set to zero because the port has no bandwidth to spare for this new channel. In particular, the target rate (i.e., target "time to next communication") within the communication is set to its maximum value, or an upper threshold, to indicate that this port of the switching or routing device is congested. Illustratively, the destination computer system will, through a feedback process, inform the originator of this action.

In state 334, the communication may be forwarded toward the destination computer system or, alternatively, may be looped back toward the originating computer system so that it learns of the switch congestion faster. In one alternative embodiment of the invention, the switching device may automatically reroute the communication to a port that has available bandwidth.

In state 336 the switching device may record various data or statistics from the communication and the processing of the communication. For example, the target rate or bandwidth may be recorded (before and/or after the rate is changed), the requested rate or bandwidth, the time at which the communication was processed, its priority, etc. After state 336, the illustrated method may end or the switching device may receive and process another communication (e.g., from the same or a different channel).

In state 340, the switching device is processing a communication received on a channel that was active (and was therefore allocated some of the port's bandwidth) during the preceding epoch. Thus, in state 340, the device determines whether the target bandwidth of the communication is greater than the bandwidth allocated to the channel. If it is, then the illustrated method proceeds to state 344; otherwise it continues at state 342.

In state 342, the target bandwidth of the communication is less than or equal to the bandwidth previously allocated to the channel. Therefore, the target bandwidth can be provided. In addition, the available bandwidth for the port can be increased by the difference between the allocated bandwidth and the target bandwidth. Also, the bandwidth previously allocated to the channel may be replaced by the target bandwidth as part of the current epoch's allocation procedure. After state 342, the method advances to state 356.

In one alternative embodiment of the invention, in state 342, if the target rate of communication is less than the requested rate, the switching device may choose not to reduce the channel's bandwidth allocation.

In state 344, the target bandwidth exceeds the channel's allocated bandwidth, so the switching device determines whether there is any additional port bandwidth available for the channel. If so, the illustrated method proceeds to state 348; otherwise it continues at state 346.

In state 346, there is no additional bandwidth available for the channel; therefore, the switching device rejects the target bandwidth and sets it to the level previously allocated to the channel. In particular, the device sets the target rate of the communication (i.e., target "time to next communication") to the inverse of the channel's allocated bandwidth. The method then advances to state 356.

In state 348, there is additional bandwidth available on the port, and the switching device determines whether it is sufficient to allow the full increase of the target bandwidth over the previously allocated bandwidth. If so, the illustrated method proceeds to state 352; otherwise it continues at state 350.

In state 350, there is sufficient available bandwidth to allow the bandwidth allocated to the channel to be increased to the target bandwidth. Therefore, the available bandwidth is decreased by the amount needed to grant the channel's new allocation. After state 350, the method advances to state 356.

In state 352, the amount of available bandwidth for the port is insufficient to allow the full increase of the target bandwidth over the previously allocated bandwidth. Therefore, the target bandwidth is set to the previously allocated bandwidth plus the available bandwidth. In particular, the target rate of the communication (i.e., target "time to next communication") is set to the inverse of this sum.

In state 354, because all of the remaining available bandwidth has been allocated, it is set to zero.

In state 356, the communication is forwarded toward the destination computer system and, in state 358, various channel or communication data/statistics may be recorded. After state 358, the method may end or the switching device may receive or process another communication.

As described above, one or more epochs may run concurrently with the processing of a communication described above.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of dynamically controlling the rate of communication between two entities, the method comprising:
   if a maximum bandwidth of a relay element situated between a first entity and a second entity has not been allocated, identifying an available bandwidth of said relay element by:
   (a) receiving one or more communications on one or more channels other than a first channel between the first entity and the second entity;
   (b) allocating a portion of the maximum bandwidth of said relay element to said other channels;
   (c) repeating said steps (a)–(b) for a predetermined period of time;
   (d) summing said bandwidths allocated to said other channels to determine a total allocated bandwidth; and
   (e) determining a difference between the maximum bandwidth and said total allocated bandwidth;
   receiving an electronic communication on said first channel at said relay element;
   retrieving from said communication a modifiable first value associated with a first target bandwidth for said first channel;
   retrieving from said communication a fixed second value associated with a desired bandwidth for said first channel, wherein the desired bandwidth is never less than said first target bandwidth; and modifying said first value in said communication to a value associated with a decreased first target bandwidth if said first target bandwidth exceeds said available bandwidth.

2. The method of claim 1, further comprising:
forwarding said communication;
wherein said first value in said forwarded communication indicates a bandwidth allocated to said first channel by said relay element.

3. The method of claim 1, wherein said modifying comprises changing said first value to a value associated with zero bandwidth.

4. The method of claim 1, wherein said first value is a time value representing a time between communication transmissions from the first entity to the second entity on said first channel.

5. The method of claim 1, wherein said electronic communication is a packet.

6. The method of claim 5, wherein said relay element is a switch and wherein said first entity and said second entity are computer systems.

7. The method of claim 1, wherein one of said first entity and said second entity is a computer system; and
wherein the other of said first entity and said second entity is an input/output subsystem.

8. The method of claim 1, wherein said modifying comprises replacing said modifiable first value with a modified first value associated with a lower target bandwidth, the method further comprising:
at said relay element, allocating the lower target bandwidth to said first channel; and
at another relay element downstream of said relay element:
  receiving said electronic communication containing said modified first value and said fixed second value; and
  allocating to said first channel a bandwidth higher than the lower target bandwidth.

9. A computer readable storage medium storing instructions that, when executed by a computer, cause the computer to perform a method of dynamically controlling the rate of communication between two entities, the method comprising:
if a maximum bandwidth of a relay element situated between a first entity and a second entity has not been allocated, identifying an available bandwidth of said relay element by:
  (a) receiving one or more communications on one or more channels other than a first channel between the first entity and the second entity;
  (b) allocating a portion of the maximum bandwidth of said relay element to said other channels;
  (c) repeating said steps (a)–(b) for a predetermined period of time;
  (d) summing said bandwidths allocated to said other channels to determine a total allocated bandwidth; and
  (e) determining a difference between the maximum bandwidth and said total allocated bandwidth;
receiving an electronic communication on said first channel at said relay element;
retrieving from said communication a modifiable first value associated with a first target bandwidth for said first channel;

retrieving from said communication a fixed second value associated with a desired bandwidth for said first channel, wherein the desired bandwidth is never less than said first target bandwidth; and modifying said first value in said communication to a value associated with a decreased first target bandwidth if said first target bandwidth exceeds said available bandwidth.

10. A method of dynamically controlling the rate of communication between two entities, comprising:
generating at a first entity a first electronic communication for transmission to a second entity over a first communication channel, wherein said first communication includes a first value indicating a target rate of communication for said channel;
receiving said first communication at a switching element;
determining whether a maximum rate of communication of said switching element has been allocated;
if said maximum rate has not been allocated, identifying an available rate of communication of said switching element by:
  (a) receiving a communication prior to said first communication at said switching element, on a channel other than said first channel;
  (b) allocating a portion of the maximum rate of communication of said switching element to said other channel;
  (c) repeating said steps (a)–(b) for a predetermined period of time;
  (d) summing said rates of communication allocated to said other channels to determine a total allocated rate of communication; and
  (e) determining the difference between the maximum rate of communication and said total allocated rate of communication;
if said switching element cannot provide said target rate of communication, altering said first value to indicate a lower target rate of communication for said first channel;
receiving said first communication at said second entity; and
communicating said first value to said first entity.

11. The method of claim 10, further comprising determining whether said switching element previously allocated a rate of communication to said first channel.

12. The method of claim 10, further comprising after said communicating:
transmitting one or more communications from said first entity toward said second entity at said lower target rate of communication.

13. The method of claim 10, wherein said generating comprises storing said first value in said first communication prior to transmitting it over said first channel.

14. The method of claim 13, wherein said generating further comprises storing a second value in said first communication; and
wherein said second value indicates a requested rate of communication for said channel.

15. The method of claim 14, wherein said first value is equal to said second value.

16. The method of claim 14, wherein one or more of said first value and said second value comprises a threshold value indicating a maximum rate of communication for said channel desired by the first entity.

17. The method of claim 14, wherein one or more of said first value and said second value comprise a threshold value indicating a minimum rate of communication for said channel desired by the first entity.

18. The method of claim 17, further comprising at said switching element:
   detecting said threshold value indicating said minimum rate of communication; and
   tearing down said channel.

19. The method of claim 14, wherein one or more of said first value and said second value comprises a time period representing a delay between transmission of successive communications over said first channel from said first entity; and
   wherein said rate of communication indicated by said time period is substantially equal to the inverse of said time period.

20. The method of claim 10, wherein said altering comprises setting said first value to a threshold value indicating a minimum rate of communication.

21. The method of claim 20, further comprising at said first entity after said communicating:
   ceasing transmission of communications to said second entity over said first channel.

22. The method of claim 10, wherein said first value is a time period between successive electronic communication transmissions from said first entity on said first channel.

23. The method of claim 22, wherein said target rate of communication is substantially equal to the inverse of said first value.

24. The method of claim 10, wherein said first value is a measure of bandwidth.

25. A computer readable storage medium storing instructions that, when executed by a computer, cause the computer to perform a method of dynamically controlling the rate of communication between two entities, the method comprising:

generating at a first entity a first electronic communication for transmission to a second entity over a first communication channel, wherein said first communication includes a first value indicating a target rate of communication for said channel;

receiving said first communication at a switching element;

determining whether a maximum rate of communication of said switching element has been allocated;

if said maximum rate has not been allocated, identifying an available rate of communication of said switching element by:
   (a) receiving a communication prior to said first communication at said switching element, on a channel other than said first channel;
   (b) allocating a portion of the maximum rate of communication of said switching element to said other channel;
   (c) repeating said steps (a)–(b) for a predetermined period of time;
   (d) summing said rates of communication allocated to said other channels to determine a total allocated rate of communication; and
   (e) determining the difference between the maximum rate of communication and said total allocated rate of communication;

if said switching element cannot provide said target rate of communication, altering said first value to indicate a lower target rate of communication for said first channel;

receiving said first communication at said second entity; and communicating said first value to said first entity.

* * * * *